(No Model.)
W. T. KELLOGG.
SASH PULLEY.
No. 539,059. Patented May 14, 1895.
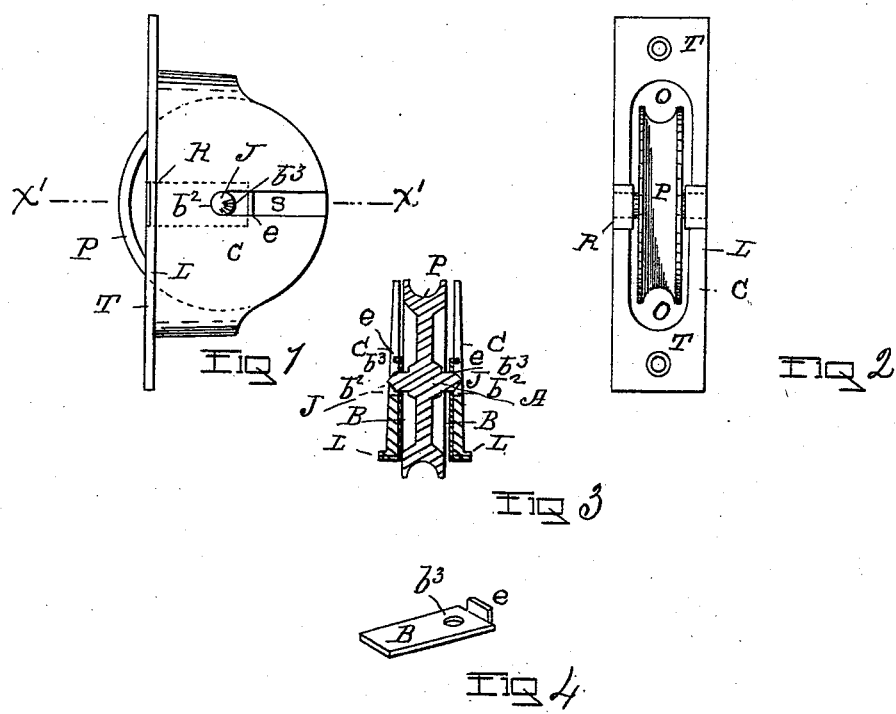
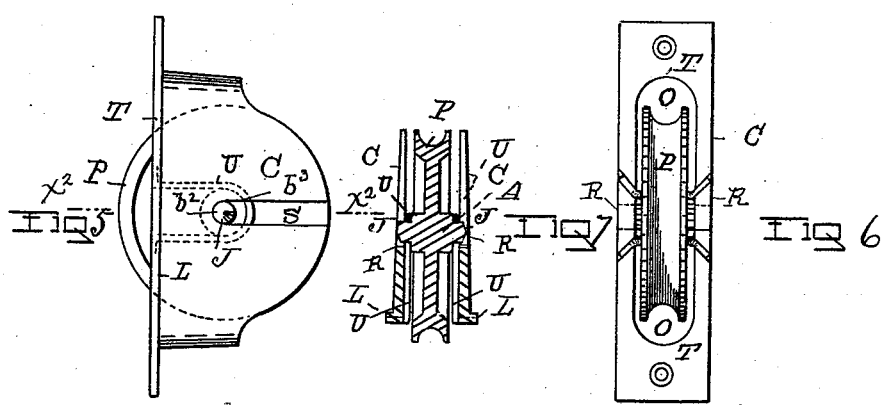
WITNESSES
William A. Sweet
Charles S. Brimhall
INVENTOR
Warren T. Kellogg
by W E Hagan
atty

UNITED STATES PATENT OFFICE.

WARREN T. KELLOGG, OF LANSINGBURG, NEW YORK.

SASH-PULLEY.

SPECIFICATION forming part of Letters Patent No. 539,059, dated May 14, 1895.

Application filed May 9, 1894. Serial No. 510,656. (No model.)

*To all whom it may concern:*

Be it known that I, WARREN T. KELLOGG, of the village of Lansingburg, county of Rensselaer, State of New York, have invented a new and useful Improvement in Sash-Pulleys, of which the following is a specification.

My invention relates to a new form of bearing for the axle journals of sash-pulleys by which the drilling and fitting of the bearings are dispensed with, and by which improvement the pulleys are made more durable, and the cost of their production is much reduced.

Accompanying this specification to form a part of it there is a plate of drawings containing eight figures illustrating my invention with the same designation of parts by letter reference used in all of them.

Of the illustrations, Figure 1 shows in side elevation a sash-pulley with my invention applied thereto. Fig. 2 is a front view of the sash-pulley shown at Fig. 1. Fig. 3 is a section taken on the line $x'$ $x'$ of Fig. 1. Fig. 4 is a perspective of a bearing-plate, shown as detached from the pulley, and of which there is one plate for each side of the case. Fig. 5 is a side view of a sash-pulley, showing a modification of my improvement. Fig. 6 is a front view of the pulley shown at Fig. 5. Fig. 7 is a section taken on the line $x^2$ $x^2$ of Fig. 5; and Fig. 8 shows in perspective and as detached a U-form bearing part of the axle-bearing at each side of the pulley, shown as detached from the latter where illustrated as applied at Figs. 5, 6, 7, and 8.

The several parts of the apparatus thus illustrated are designated by letter reference and the function of the parts is described as follows:

The letter C, designates the sash-pulley case having the slot S, formed in each of its opposite sides in alignment, with each of said slots having at its inner end the rounded bearing surface $b^2$.

The letter R, designates a recess formed in the front face T and lip L, at each side of the opening O, made in the case for the reception of the pulley.

The letter B, designates a plate made with a bearing passage $b^3$ and a turned up inner end $e$, and of which plates there is one at each side of the pulley case.

The letter P designates the pulley and A, its axle having the journals J, J, and the parts as thus made are connected as follows:

One of the plates B, is passed on over each of the journals J, and the pulley and each of the plates B, are entered through the passage O, with each of the journals in one of the slots S, until each of the latter rests in the bearing-part $b^2$, of the slot, and the bearing $b^3$, of each of the plates B, with the ends of the latter projecting out through the opening O, at each side of the case and as thus held the projecting ends of the plates B, are then bent over and down so as to rest in one of the recesses R, formed in the outer face of and at each side of the case. As thus connected each of the journals J, is held in a bearing formed at each side of the case by the rounded surface of the slot S, and the bearing $b^3$, produced in the plate B, thereat, this bending of the top of the plates B, being the only fitting required to connect the parts, and thus constructed there may be used if desirable a pulley and axle cast in one piece.

In the modification shown at Figs. 5, 6, 7, and 8, instead of the plate B, a U-form staple U, is employed with its bearing end $b^3$, there being one of them arranged to engage with the rear side of the axle journals at each side of the pulley and where extended upwardly within the case to be bent down at its ends $e^2$, $e^2$, to engage with the recess R, made in the outer face of the case at each side of the opening O, as shown at Fig. 6. When made to use either the plate B, or the staple U, the function of the parts is the same; each of them forming the inner side of the bearing in which the pulley axles journal while the rounded end of the slot S, forms the other part of the bearing. The turned-up end $e$, of the plate B, projects into the slot S, but the plate B, may if desired be made without the projecting end $e$, and perform the same office and the axle and wheel may be cast in one piece or separately as desired, although they are preferably made in one piece. As thus made and arranged my invention may be applied to any form of sash-pulley case having vertical sides in which the slots S may be formed, and it may be applied to furniture casters and used to make a bearing for the rollers of the latter.

Having thus described my invention, what

I claim, and desire to secure by Letters Patent, is—

1. In a bearing for sash pulleys the combination with a slot formed in and projected frontwardly from the rear end of the pulley case at each side thereof to receive the outer face of the axle journal; of a bearing-part adapted to be passed on over the axle journal to make a bearing engagement with the rear side of the latter at each side of the case, and therefrom extended frontwardly to connect with the outer face of the pulley case at each side thereof by being bent down thereon, substantially in the manner as and for the purposes set forth.

2. The combination with a sash pulley case, of a slot having a rounded out inner end and projected inwardly from the rear of the pulley case at each side thereof to form a bearing for the front side of the pulley axles; of a bearing-part having a rounded bearing surface for the rear side of the axle to journal in, at each side of the case, and each of said bearing-parts made to extend outwardly therefrom and to connect with the front of the pulley case by being bent down thereon, substantially in the manner as and for the purposes set forth.

3. The combination with the case C, made with the bearing slots S, in each of its opposite sides; of the pulley P, having the axle journals J, J; and the bearing-part $b^2$, made to engage with the lower side of each of the axle journals at each side of the case, and at its upper end to connect with the case top by being bent over the latter for attachment, substantially as and for the purposes set forth.

Signed at Troy, New York, this 1st day of May, 1894, and in the presence of the two witnesses whose names are hereto written.

WARREN T. KELLOGG.

Witnesses:
W. E. HAGAN,
CHARLES S. BRINTNALL.